(12) United States Patent
Talaalout et al.

(10) Patent No.: US 9,933,534 B2
(45) Date of Patent: Apr. 3, 2018

(54) SEISMIC COUPLING SYSTEM AND METHOD

(71) Applicant: TOTAL SA, Courbevoie (FR)

(72) Inventors: Abdelkrim Talaalout, Massy (FR); Thierry Brizard, Ollainville (FR)

(73) Assignee: TOTAL SA, Courbevoie (FR)

( * ) Notice: Subject to any disclaimer, the term of this patent is extended or adjusted under 35 U.S.C. 154(b) by 0 days.

(21) Appl. No.: 15/027,591

(22) PCT Filed: Nov. 9, 2015

(86) PCT No.: PCT/IB2015/002259
§ 371 (c)(1),
(2) Date: Apr. 6, 2016

(87) PCT Pub. No.: WO2016/139503
PCT Pub. Date: Sep. 9, 2016

(65) Prior Publication Data
US 2016/0320503 A1    Nov. 3, 2016

Related U.S. Application Data

(60) Provisional application No. 62/126,726, filed on Mar. 2, 2015, provisional application No. 62/218,033, filed on Sep. 14, 2015, provisional application No. 62/141,945, filed on Apr. 2, 2015.

(51) Int. Cl.
*G01V 1/16* (2006.01)
*G01V 1/38* (2006.01)

(52) U.S. Cl.
CPC .............. *G01V 1/166* (2013.01); *G01V 1/168* (2013.01); *G01V 1/3852* (2013.01)

(58) Field of Classification Search
CPC ........ G01V 1/166–1/168; G01V 1/047; G01V 1/3852
USPC ....................................... 367/4; 181/401–402
See application file for complete search history.

(56) References Cited

U.S. PATENT DOCUMENTS

| | | | | |
|---|---|---|---|---|
| 3,031,966 A | * | 5/1962 | Metzger | F42B 12/40 101/368 |
| 3,054,085 A | * | 9/1962 | Alexander | G01V 1/181 367/177 |
| 3,373,400 A | * | 3/1968 | Epstein | G01V 1/38 102/406 |
| 3,704,764 A | * | 12/1972 | Henderson | G10K 11/004 181/114 |

(Continued)

FOREIGN PATENT DOCUMENTS

WO    2014/057239 A1    4/2014

OTHER PUBLICATIONS

International Search Report in related International Application No. PCT/IB2015/002259, dated Mar. 8, 2016.

(Continued)

*Primary Examiner* — Isam A Alsomiri
*Assistant Examiner* — Amie M Ndure
(74) *Attorney, Agent, or Firm* — Patent Portfolio Builders PLLC

(57) ABSTRACT

A method and sensor device for recording seismic data. The sensor device includes a top section and a bottom section removably attached to the top section through a connecting plug. The bottom section holds a coupling material that is released into ground upon the bottom section impacting the ground.

21 Claims, 16 Drawing Sheets

(56) References Cited

U.S. PATENT DOCUMENTS

| | | | |
|---|---|---|---|
| 3,859,598 A | | 1/1975 | McElwain et al. |
| 4,556,066 A | * | 12/1985 | Semrow ............... A61B 8/4281 600/372 |
| 5,080,190 A | | 1/1992 | Owen et al. |
| 5,187,332 A | | 2/1993 | El-Rabaa et al. |
| 5,494,038 A | * | 2/1996 | Wang .................. A61B 8/0866 600/459 |
| 6,531,965 B1 | * | 3/2003 | Kaiser .................. F42B 12/365 102/513 |
| 6,879,547 B1 | * | 4/2005 | Updegrove ............... F42B 8/28 367/173 |
| 6,951,138 B1 | | 10/2005 | Jones |
| 7,948,829 B2 | * | 5/2011 | Snow ........................ G01S 5/30 367/127 |
| 8,998,536 B2 | | 4/2015 | Meunier |
| 2006/0256652 A1 | * | 11/2006 | Thomas ............... G01V 1/3808 367/15 |
| 2008/0078865 A1 | | 4/2008 | Bume |
| 2008/0137484 A1 | * | 6/2008 | Scott ..................... G01V 1/186 367/188 |
| 2011/0075513 A1 | * | 3/2011 | Snow ........................ G01S 5/30 367/37 |
| 2014/0078865 A1 | | 3/2014 | Coste et al. |
| 2014/0307525 A1 | | 10/2014 | Postel et al. |
| 2014/0328144 A1 | * | 11/2014 | Huntley ................. G01V 1/166 367/188 |
| 2015/0053480 A1 | * | 2/2015 | Kare ...................... G01V 1/166 175/19 |

OTHER PUBLICATIONS

Written Opinion of the International Searching Authority in related International Application No. PCT/IB2015/002259, dated Mar. 8, 2016.

J. Ostdiek, "Drone Sensor Deployment Mechanism", Jan. 29, 2015, downloaded from the Internet Aug. 12, 2015, pp. 1-4 (https://jaredostdiek.wordpress.com/projects/drone-sensor-deployment-mechanism/).

Drone Analyst, "Why Drones Are the Future of the Internet of Things", Dec. 1, 2014, downloaded from the Internet Aug. 12, 2015, pp. 1-4 (http://http://droneanalyst.com/2014/12/01/drones-are-the-future-of-iot/).

DIY Drones, "UgCS operates two DJI Phantom2 simultaneously", Sep. 23, 2014, downloaded from the Internet Aug. 12, 2015, pp. 1-5 (http://diydrones.com/profiles/blogs/ugcs-operates-two-dji-phanton2-simultaneously/).

* cited by examiner

SEISMIC COUPLING SYSTEM AND METHOD

CROSS REFERENCE TO RELATED APPLICATIONS

The present application claims the benefit of priority under 35 U.S.C. § 119(e) to U.S. Provisional Application No. 62/141,945 filed on Apr. 2, 2015, 62/126,726 filed on Mar. 2, 2015 and 62/218,033 filed on Sep. 14, 2015, the entire contents of which are hereby incorporated by reference.

BACKGROUND

Technical Field

Embodiments of the subject matter disclosed herein generally relate to the field of seismic sensing. In particular, the embodiments disclosed herein relate to devices, methods and systems for seismic coupling for geophysical sensing applications.

Discussion of the Background

Seismic sensors are deployed over land for geophysical data applications. The sensors need to make firm contact with the ground in order to accurately record seismic data. Firm contact is today achieved when a human operator "plants" each sensor firmly into the ground. However, for high density seismic acquisitions, the number of sensors that need to be deployed is too large for being efficiently planted by humans. Thus, some traditional seismic acquisitions skip this step and the human operator just "drops" the sensors on the ground. For this scenario, the sensors often suffer from substandard coupling to the ground, resulting in poor data quality.

Commonly assigned U.S. Pat. No. 8,998,536, which is incorporated herein by reference, describes a solution in which a machine digs a trench, deploys the sensors in the trench, and then covers the sensors with soil. While the quality of the geophysical data generated may be improved, implementing such a solution adds complexity to the deployment process. In addition, such a method requires that the machine has easy access to the place where the sensors need to be deployed, which sometimes is not possible. Further, such method may inaccurately place the sensors or damage them during deployment.

What is needed is a deployment and coupling solution that does not add significant complexity to the acquisition process.

SUMMARY

As detailed herein, a seismic sensor device for land or marine deployment has a bottom section that holds a fluid. As the sensor device is deployed, when touching the ground, the fluid is released around the bottom section to improve a coupling between the ground and the bottom section. A seismic sensor located in the bottom section is in contact with the fluid, thus achieving a good coupling with the ground.

According to an embodiment, there is a sensor device for recording seismic data. The sensor device includes a top section and a bottom section removably attached to the top section through a connecting plug. The bottom section holds a coupling material that is released into ground upon the bottom section impacting the ground.

According to another embodiment, there is a seismic system for recording seismic data. The seismic system includes a sensor device that measures seismic data and an aerial vehicle configured to release the sensor device from a certain height above a target position. The sensor device includes a top section and a bottom section removably attached to the top section through a connecting plug. The bottom section holds a coupling material that is released into ground upon the bottom section impacting the ground.

According to still another embodiment, there is a method for collecting seismic data. The method includes a step of deploying an aerial vehicle, which carries a sensor device, above a target position on the ground, a step of releasing the sensor device from a certain height above the ground, and a step of releasing a coupling material from the sensor device when hitting the ground. The coupling material provides a better coupling of a seismic sensor inside the sensor device with the ground.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. In the following, the embodiments are discussed with regard to land deployed seismic sensors. However, these embodiments equally apply to marine deployed ocean bottom sensors.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

As detailed herein, a novel seismic sensor device for geophysical sensing includes a bottom section and a top section, which is detachably attached to the bottom section. The bottom section houses a seismic sensor and a fluid medium that is configured to be deployed outside when the seismic sensor device contacts the ground. The top section includes various components, among which, a storage device for storing seismic information recorded by the seismic sensor. The storage device may additionally be used just for temporary storage (buffer) to aid the wireless transmission of data. In another embodiment, the storage device may not be used, with the data being transmitted wirelessly as captured. In yet another embodiment, the storage device could also be used to store non-seismic data, e.g., information as commands to turn off, go to low power mode, etc. After a given time, the top section is retrieved while the bottom section remains in the ground.

Figure 1:
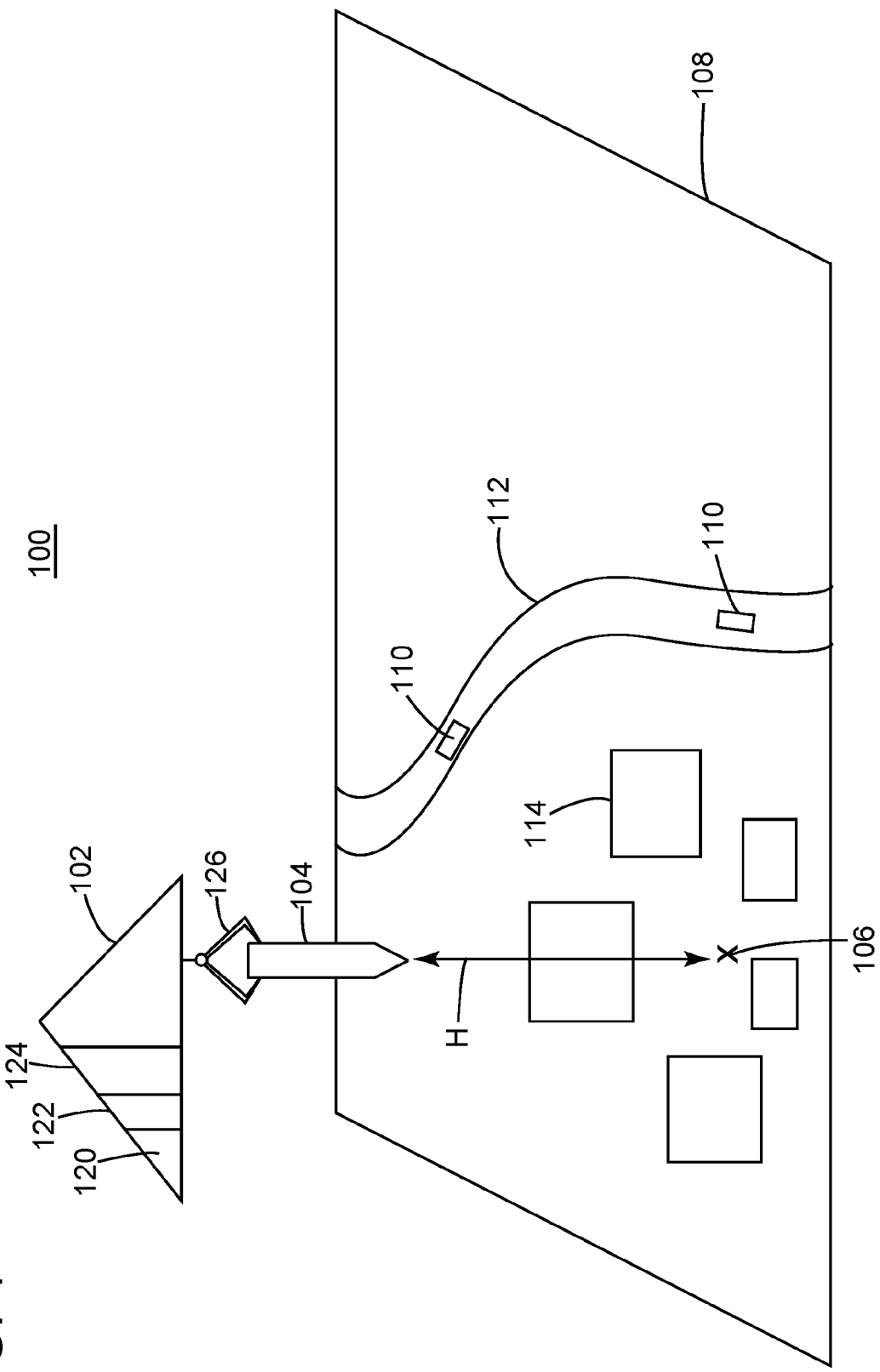
FIG. 1 is schematic diagram of a land seismic survey.

In an embodiment illustrated in FIG. 1, an aerial vehicle (AV) 102 carries at least one seismic sensor device 104. AV 102 may be remotely controlled to drop sensor device 104 toward a target position 106. Target position 106 is located within a seismic survey area 108. Many other land targets (not shown) belong to the seismic survey area 108 and each one receives a sensor device for recording seismic data. AV 102 may be an aircraft, drone, balloon, dirigible, etc. that is remotely controlled, for example, from a command center 110. Command center 110 may be a truck that follows a certain road or path 112. In one embodiment, the command center 110 is located in a building, far away from the survey area 108. In still another application, the AV 102 is a manned aircraft, e.g., a helicopter. The AV 102 may carry one or more sensor devices. Although the embodiment of FIG. 1 shows the AV 102 carrying only one sensor device, it may carry tens of such devices. AV 102 may include a propulsion system 120 (e.g., motor and propeller), a processing system 122 (e.g., processor and memory), a communication system 124 (e.g., receiver and transmitter) for communicating with the command center 110 and/or sensor device 104. Communication with the command center can also be made, optionally, via a mesh formed by the AUVs and/or sensors (i.e., use the fleet as a communication network). AV 102 may also include other components, e.g., global positioning system (GPS), power supply, etc.

In the embodiment shown in FIG. 1, target position 106 is surrounded by boulders or other obstacles 114, making the area inaccessible to a truck. Thus, a traditional approach of using a truck for deploying the sensor device 104 may not be feasible. For this reason, AV 102 releases the sensor device 104 from a certain height H above the target position 106, as illustrated in FIG. 1. AV 102 may have an arm 126 that holds sensor device 104, and releases it when instructed by processing system 122. In one application, the processing system is programmed to instruct the release of the sensor device by the command center, via the communication network. In another application, the processing system is programmed before the survey to release the sensor device, or the processing system learns to release the sensor device from new knowledge gained from machine learning. Other mechanisms for holding and releasing sensor device 104 may be used, as would be known by those skilled in the art.

Figure 2:
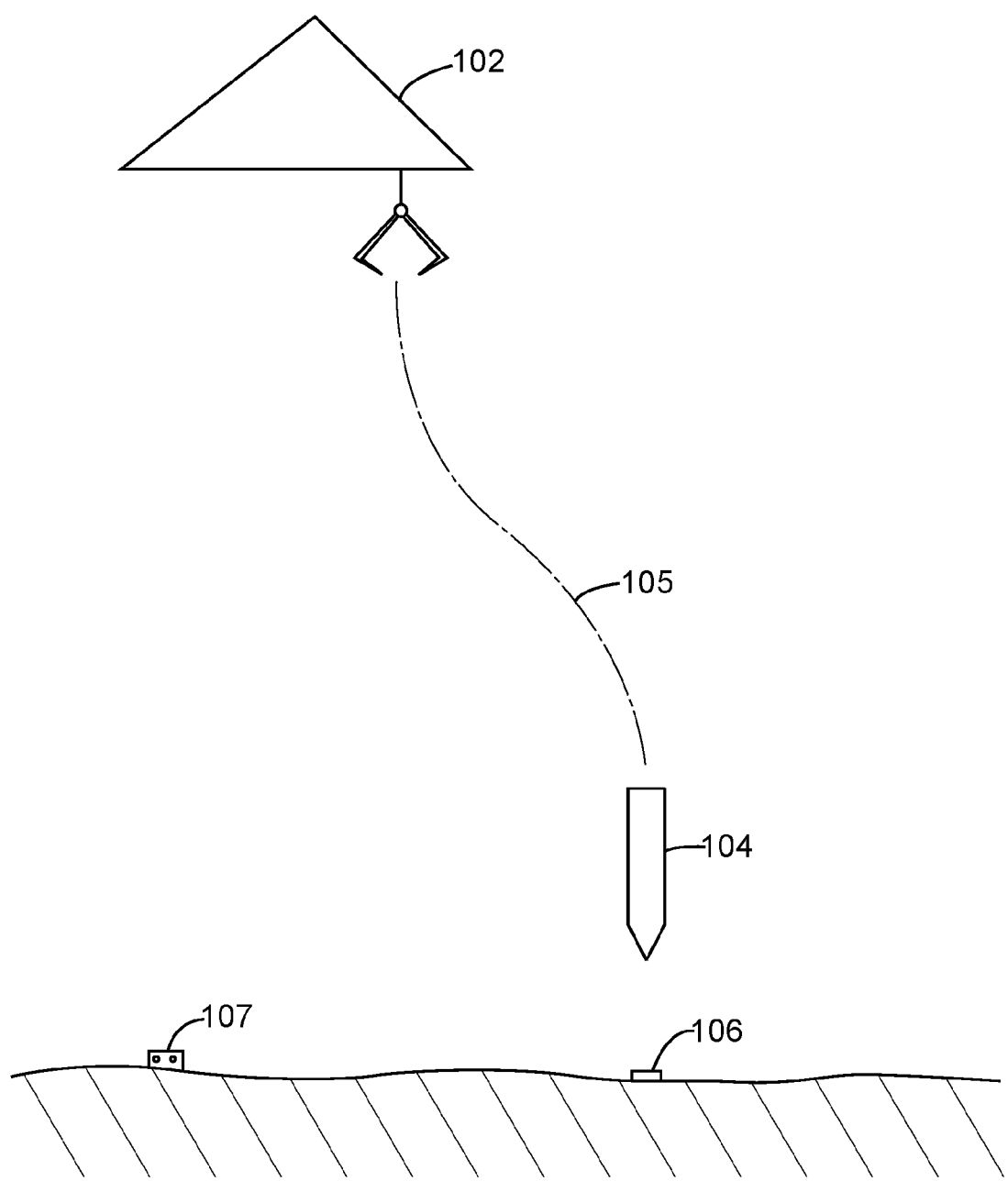
FIG. 2 is a schematic diagram of a seismic sensor device in free-fall.

Sensor device 104 flies through the air toward the target position as illustrated in FIG. 2. Sensor device falls under the influence of gravity toward the target position. In one embodiment, sensor device does not have any propulsion mechanism for correcting its trajectory. However, in one embodiment, sensor device includes a propulsion mechanism, as discussed next, for correcting its trajectory 105 as illustrated in FIG. 2. FIG. 2 shows a support vehicle 107 that may assist sensor device 104 to land at the desired target position 107.

Figure 3:
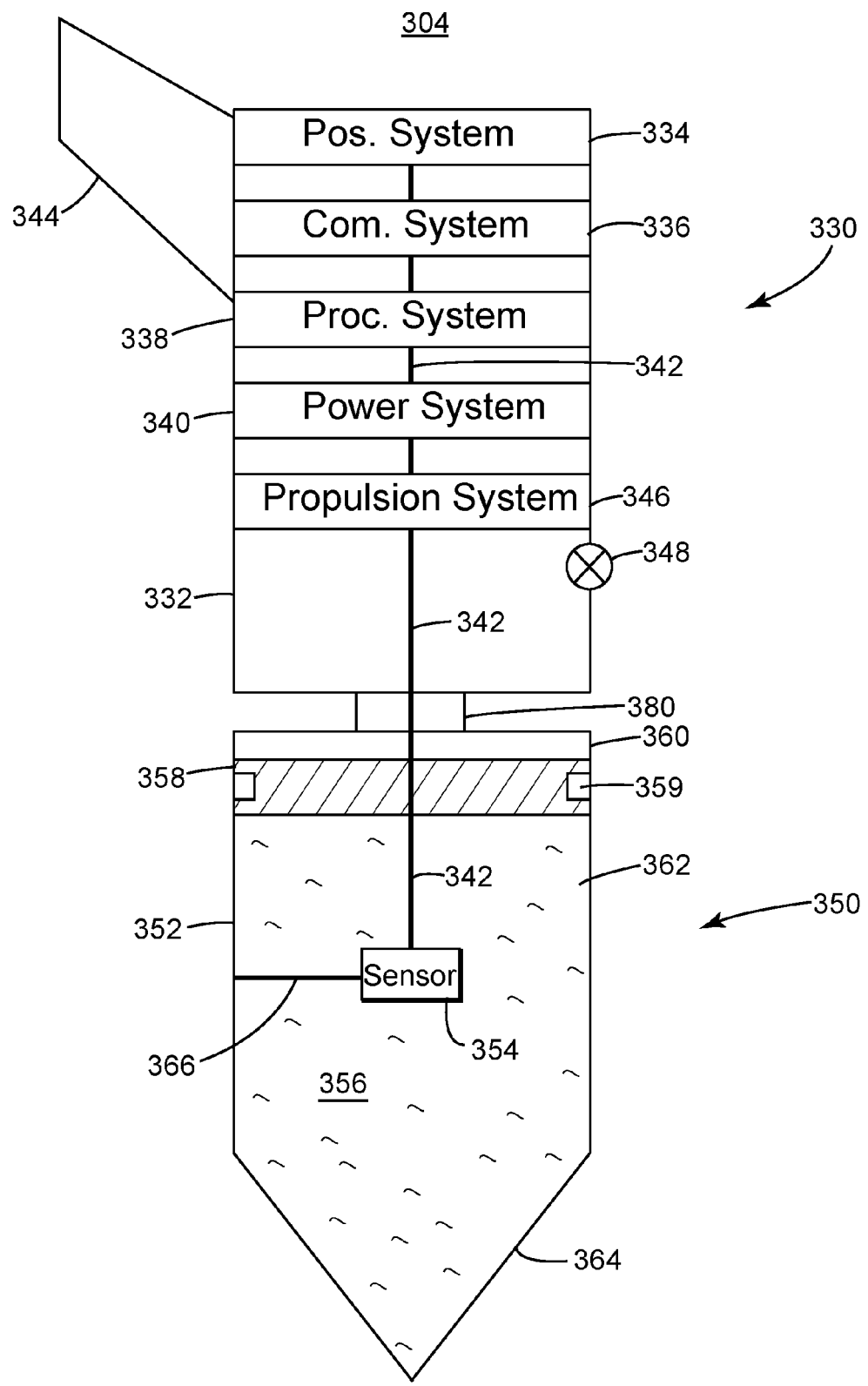
FIG. 3 is a schematic diagram of a seismic sensor device.

FIG. 3 shows a schematic diagram of a sensor device 304. Sensor device 304 has a top section 330 and a bottom section 350. Top section or bottom section or both have a corresponding connecting plug 380 that electrically connects the two portions to each other. Connection plug 380 ensures that data and/or power is exchanged between the two portions. Top section is removably attached to the bottom section through the connection plug 380. This means that by simply puling one section apart from the other section, the two sections separate from each other. Top section 330 has a housing 332 that accommodates various components as now discussed. One such component is a positioning system 334 that is configured to measure the position of the sensor device. Such a positioning system may be a GPS system. In one application, the positioning system 334 does not measure the sensor device's position, but receives it from the AV 102 or the support vehicle 107 located on the ground. Support vehicle 107 may use a radar system for determining the sensor device's position.

Housing 332 also includes a communication system 336 for communicating with AV 102 and/or command center 110 and/or support vehicle 107. Communication system 336 may include a receiver and a transmitter for communicating data in a two-way manner. Any known communication method may be implemented. Communication system 336 may also include an antenna for wireless communication. Communication system 336 may be connected to a processing system 338 that offers processing support. Processing system 338 may include a processor for supporting various seismic processing activities, and/or positioning activities, and/or communication activities. Processing system 338 may also include a storage unit for storing various instructions, seismic data, commands, etc.

All these systems need to be powered up in order to function. For this reason, a power system 340 is located inside housing 332 and it may include a power generator, as for example, a battery, fuel cell, solar cell, etc. In one application, one or more of the above systems may be integrated in a single component. FIG. 3 shows a cable 342 connecting each component to the others for sharing power and/or data. Cable 342 may extend all the way to connecting plug 380 for transmitting power to, and for receiving data from the bottom section 350.

As will be recognized by those skilled in the art, other components may be located inside the top section 330. For example, if the sensor device is configured to control its trajectory, one or more fly control mechanism 344 (e.g., a wing of which only one is shown for simplicity) are attached to an outside of housing 332. Wing 344 may be fixed or controlled by a propulsion system 346. Propulsion system 346 may also include one or more actuators (e.g., propellers) 348 for changing a trajectory of the sensor device.

Bottom section 350 has its own housing 352 that includes a seismic sensor 354 surrounded by a coupling material 356. A piston 358 is located inside the housing 352 and splits it into first and second chambers 360 and 362. Second chamber 362 holds the coupling material 356 while the first chamber 360 holds air. Piston 358 may have a circumferential seal 359 that presses against the inner wall of housing 352 for sealing the first chamber from the second chamber. However, in one embodiment, seal 359 may be made loose to allow a small amount of the coupling material from the second chamber to escape in the first chamber when piston 358 moves toward tip region 364.

Seismic sensor 354 is electrically connected to cable 342 for receiving electrical power and for transmitting the recorded seismic data to the processing system 338. Seismic sensor 354 may include one or more of the following: hydrophone, geophone, accelerometer, MEMS sensor, optical sensor, or other known sensors. Seismic sensor 354 may be attached to the interior of housing 352 by a bracket 366. In one application, seismic sensor 354 is attached to the piston 358 so that the seismic sensor moves with the piston.

Figure 4:
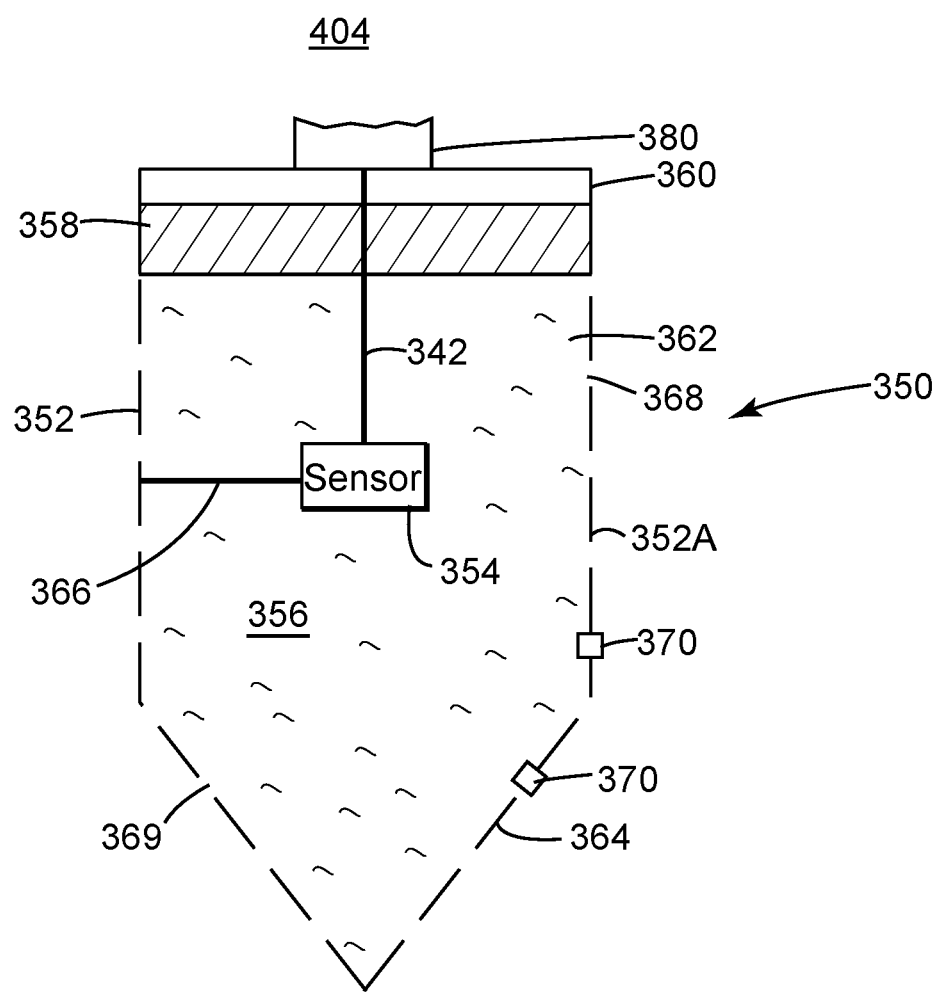
FIG. 4 is a schematic diagram of a bottom section of a seismic sensor device.

Coupling material 356 may be a fluid, gelatinous or pellet type material. For example, the coupling material may be a silicone gel. Additionally, the coupling material may include two immiscible fluids, with different densities, so that one could be more gelatinous and be useful for coupling below surface, and the more fluid section could remain on top and seal the pathways of the housing. Housing 352 has a certain number of pathways 368 created on its lateral sides 352A, as illustrated in FIG. 4. Pathways 368 may be, in one embodiment, simple holes in the lateral sides 352A of housing 352. In one embodiment, plugged pathways 369 may also be formed in the tip region 364 of housing 352. In one embodiment, both pathways 368 and 369 may be present. In one embodiment, the density of pathways per area changes from the tip region 364 toward the top region. In one embodiment, a diameter of the pathways is larger toward the tip region and smaller toward the top region. The pathways are designed to allow the coupling material 356 to be released outside housing 352 once the sensor device is deployed into the ground.

For keeping the coupling material 356 inside housing 352 while the sensor device 404 is airborne, caps 370 (only two are illustrated for simplicity) are plugging the pathways 368 and/or 369. These caps may be made of various materials, for example, plastic, wood, composite, epoxy, paper, cork. In one embodiment, the caps are loosely attached to the pathways so that when the sensor device hits the ground, the caps fall off from the housing.

Figure 5:
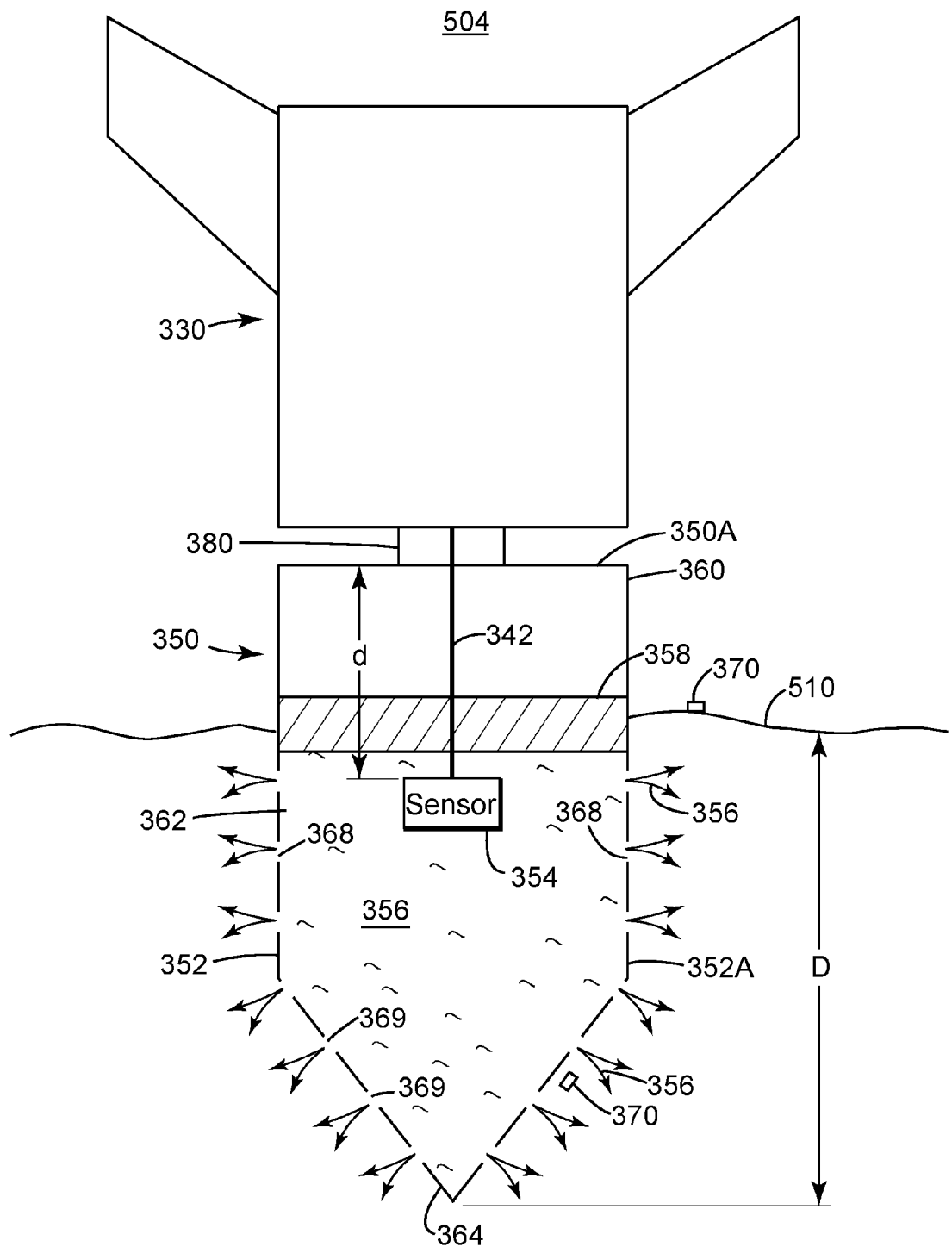
FIG. 5 illustrates how a seismic sensor device enters the ground after a free-fall landing.

After the sensor device has hit the ground and is attached to the soil, the coupling material is released in the ambient around the sensor device. This is achieved by the action of piston 358. Because of the impact between the sensor device and the ground, the piston 358's momentum forces piston 358 to move downwards, as illustrated in FIG. 5, which results in the coupling material pushing out the caps 370 (if they already did not fall due to the landing impact) and spreading around the housing 352. FIG. 5 shows the first chamber 360 being larger and the second chamber 362 being smaller than the corresponding chambers in FIG. 4. FIG. 5 also shows caps 370 lying around the sensor device and the coupling material 356 being pushed out through pathways 368 and 369. In one application, a breakaway mechanism (not shown) may be located inside first chamber 360 for assisting piston 358 move toward the tip region 364, making the caps to fall off and open the pathways and force the coupling material out of the bottom section of the sensor device.

As shown in FIG. 5, the bottom section 350 of sensor device 504 may penetrate a certain depth D, from the earth surface 510, into the ground. This distance depends from many factors, some of which are the weight of the sensor device, the height from which the sensor device is launched, the type of soil, etc. In one embodiment, these factors are considered when designing the sensor device, which results in more than one configuration of the sensor device. In other words, it is possible to have a set of sensor devices, with one subset being appropriate for compact soil, one subset being appropriate for unconsolidated soil, etc.

FIG. 5 illustrates a sensor device having the tip portion 364 shaped as an arrow, which is appropriate for unconsolidated soil. Also, FIG. 5 shows that a distance d from the top end 350A of the bottom section 350 to the first pathway 368 is calculated so that the first pathway gets embedded into the soil (i.e., all the pathways are underground). In one application, some pathways may remain above ground to seal the sensor-earth-air interface, with the filing material. The harder or the more compact the soil, the larger the distance d. For example, if the soil is made only of sand, and the bottom region 350 is expected to fully penetrate into the sand, then distance d may be made zero.

Figure 6:
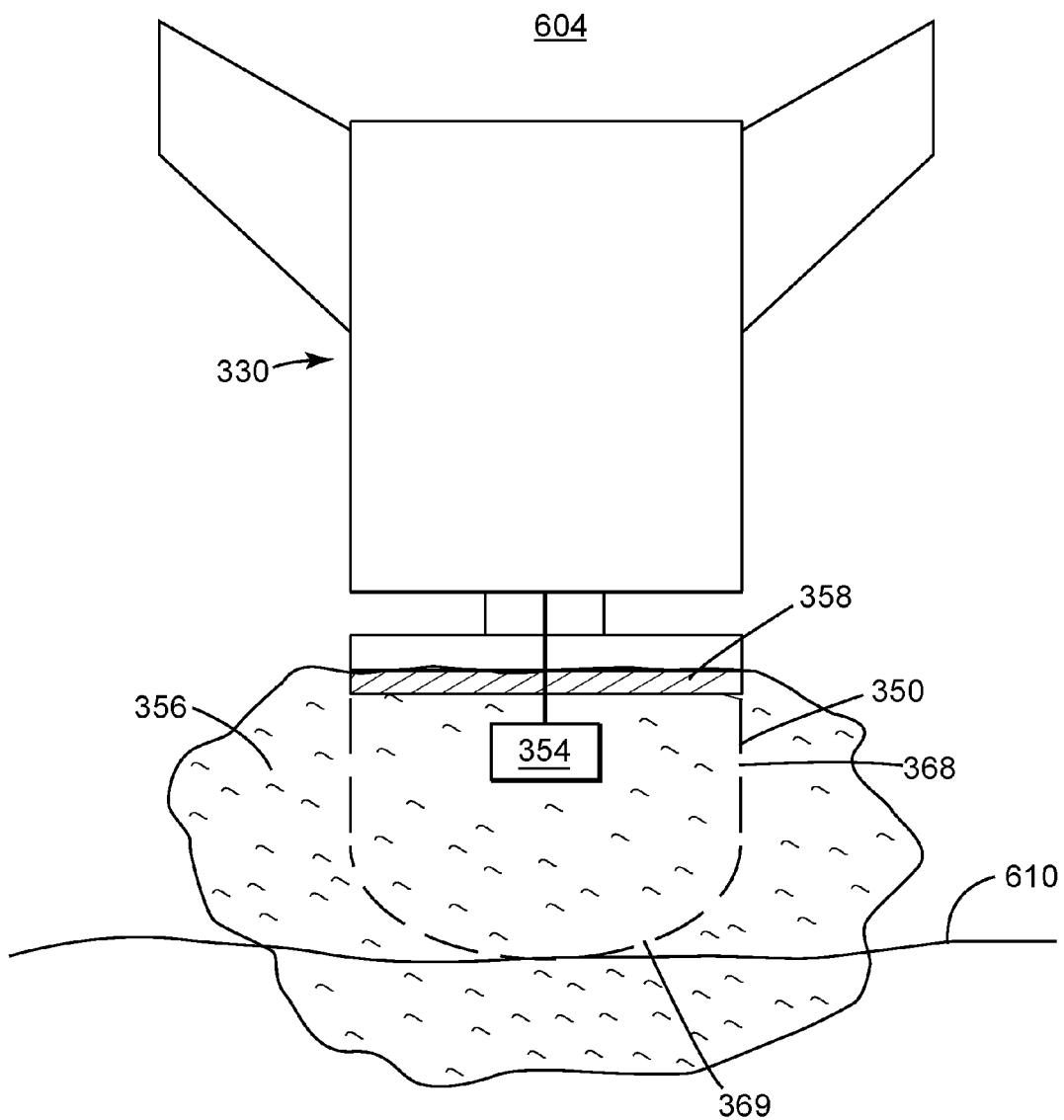
FIG. 6 illustrates how a seismic sensor device impacts the ground after a free-fall landing.

However, if the soil is very hard, compact, then the tip portion 364 may be made very round, as illustrated in FIG. 6. In this case, the bottom section may not even penetrate the soil at all. However, the coupling material 356 is expected to exit housing 352 and contact the ground so that a good coupling is achieved between the seismic sensor 354 and the ground through the coupling material.

The bottom section may be made of various materials. In one application, when the soil is soft and the tip section is expected to penetrate it, the bottom section may be made of plastic or metal. In one embodiment, if there is a desire to leave no trace after the survey, the bottom section may be made of a biodegradable material. In still another embodiment, the bottom section may be made of a material, e.g., clay, which will break on impact with the ground to quickly release the coupling material.

The coupling material, when stored in the second chamber of the bottom section, retains its state. However, when it is forced out into the volume surrounding the sensor device, the coupling material would provide an interface between the seismic sensor and the soil, thus enabling proper coupling. If the coupling material is a fluid or gelatinous material, on deployment and once outside the housing, the coupling material may changes its state, e.g., may solidify to enable better coupling. In another embodiment, if the coupling material is a gel while inside the second chamber, the coupling material will maintain its state even when outside the housing. Depending on the material of the coupling material and on the type of soil (consolidated or unconsolidated), when pushed outside the hollow cavity, the coupling material may remain in its initial state, solidify or could be in an intermediate state.

Figure 7:
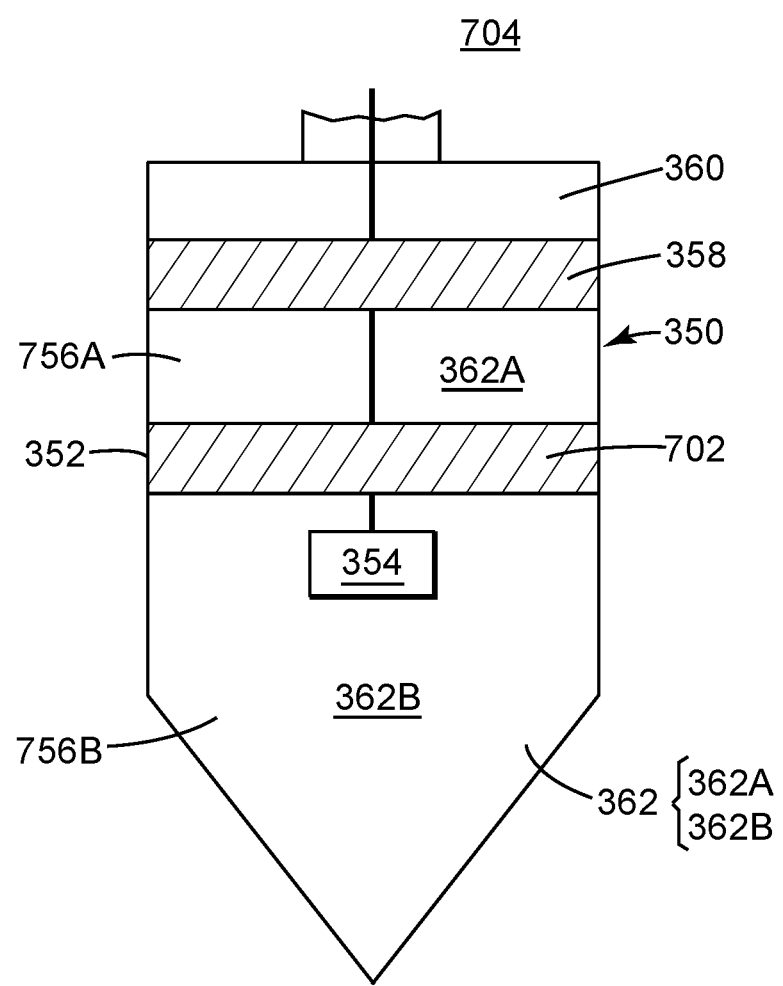
FIG. 7 illustrates another seismic sensor device.

In one embodiment as illustrated in FIG. 7, the second chamber 362 has another piston 702, which divides the second chamber into top and bottom chambers 362A and 362B, respectively. The top chamber 362A may hold a first coupling material 756A and the bottom chamber 362B may hold a second coupling material 756B. The first and second coupling materials may be different from one another. In one embodiment, the first coupling material may be in a gel state while the second coupling material may be in fluid state. In one application, the first and second coupling materials chemically react with each other outside the housing to change their state.

After the coupling material has settled outside the housing and a good coupling has been achieved between the seismic sensor and the ground, the sensor device is ready to record the seismic data. The processing system in the top section may be programmed to instruct the sensor to record the seismic data after a given time after the sensor device has landed and the coupling material has cured (or hardened). The recorded seismic data will be stored at the processing system for a given time interval or just temporary stored as in a buffer. When the seismic survey is ready, the recorded seismic data may be retrieved in various ways. Alternatively, the seismic data may be transmitted during the seismic survey without any storage.

Figure 8:
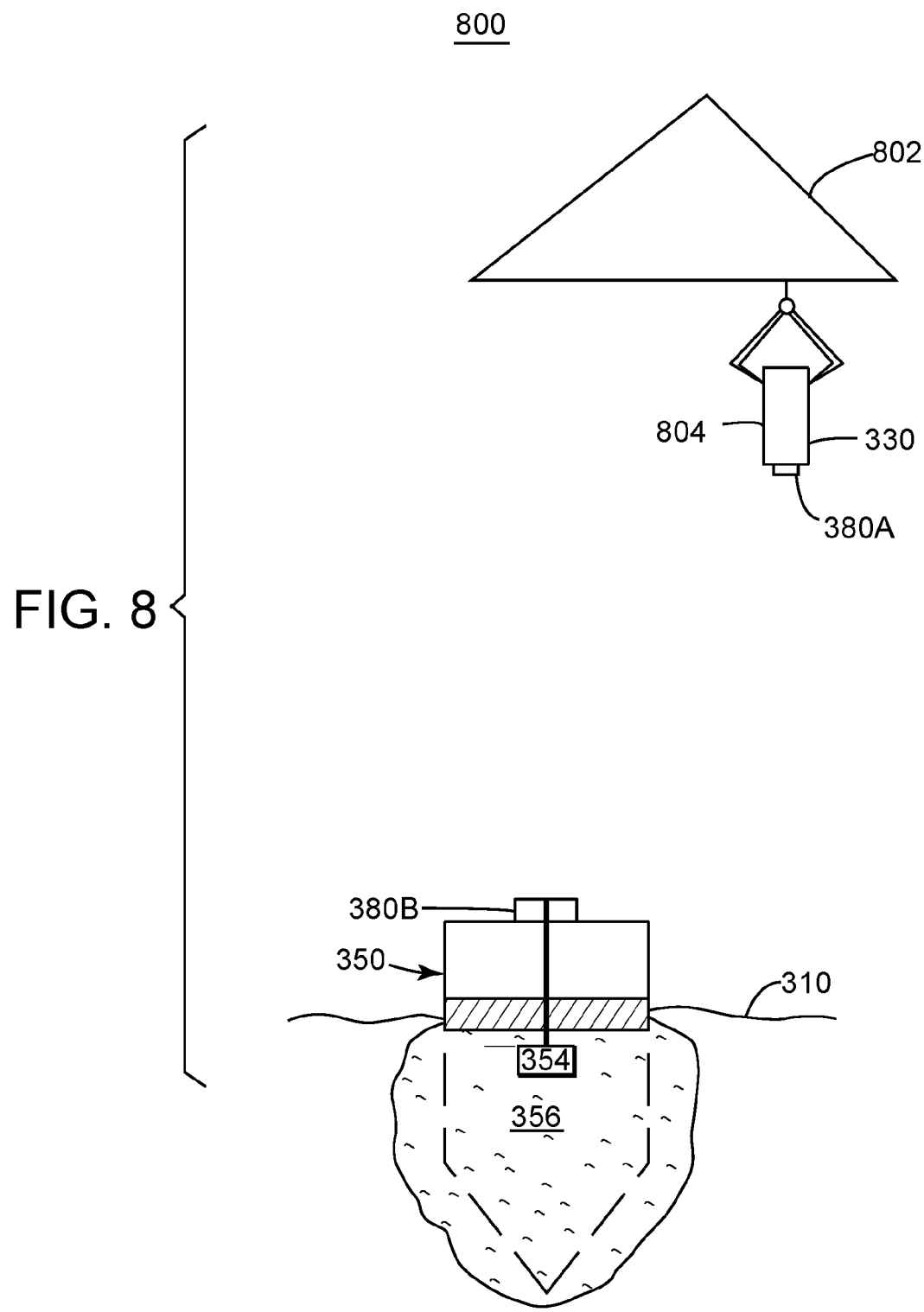
FIG. 8 illustrates a retrieval process for the seismic sensor device.

One approach is to send the AV 102 to retrieve the top section 330 of sensor device 300, while leaving the bottom section 350 in the ground, as illustrated in FIG. 8. FIG. 8 shows a survey system 800 that includes AV 802 and sensor device 804. Sensor device 804 has been deployed on the ground. After recording seismic data for a given time, the AV 802 returns to collect the top portion 330 of sensor device 804. Each of the top and bottom sections 330 and 350 has corresponding connecting plugs 380A and 380B. Connecting plugs 380A and 380B ensure, as discussed above, electrical and data communication between the top and bottom sections. They mate to each other as male/female parts, and once the top section is pulled by the AV, apart from bottom section, the two connecting plugs easily disconnect from each other. The top section is then carried to the command vehicle or another place where the seismic data stored on board is either harvested or left for further data collection. The harvesting process may be performed in a wireless manner or by physical removing a removable memory from top section 330 and reading that memory in the command vehicle.

Another possibility is to move a harvesting device past each sensor device and in a wireless manner transfer the seismic data from the sensor device to the harvesting device. The harvesting device may be a laptop, aircraft, truck, etc. In one application, the harvesting device may be the AV 102. Other ways for collecting the seismic data may be used, as are known in the art.

Figure 9:
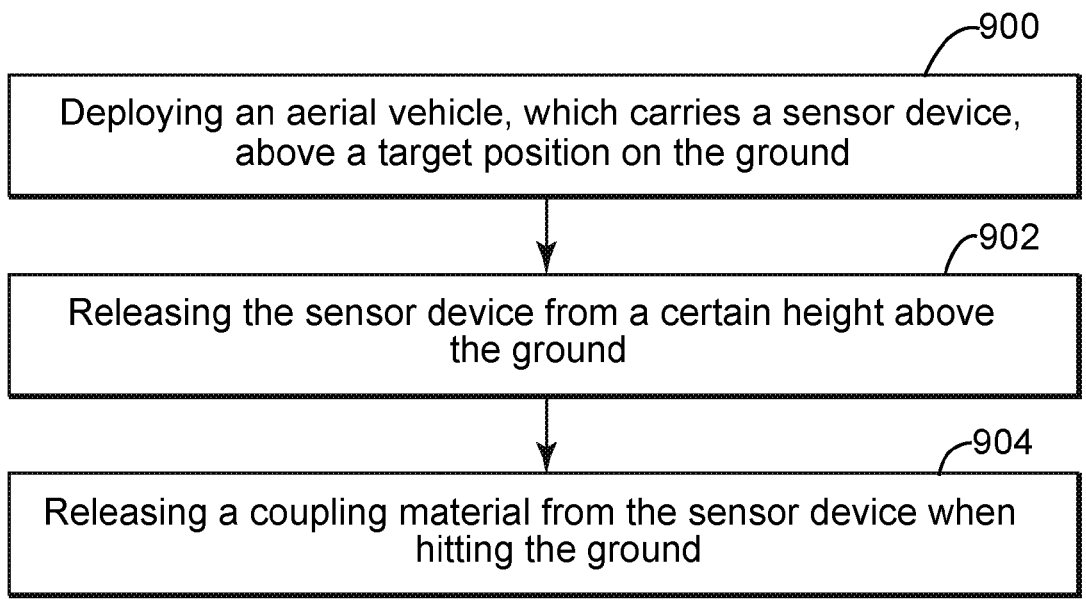
FIG. 9 is a flowchart of a method for deploying a seismic sensor device.

A method for using the sensor device 300 is now discussed with regard to FIG. 9. The method includes a step 900 of deploying an aerial vehicle, which carries a sensor device, above a target position on the ground, a step 902 of releasing the sensor device from a certain height above the ground, and a step 904 of releasing a coupling material from the sensor device when hitting the ground. The coupling material provides a better coupling of a seismic sensor inside the sensor device with the ground.

Figure 10:
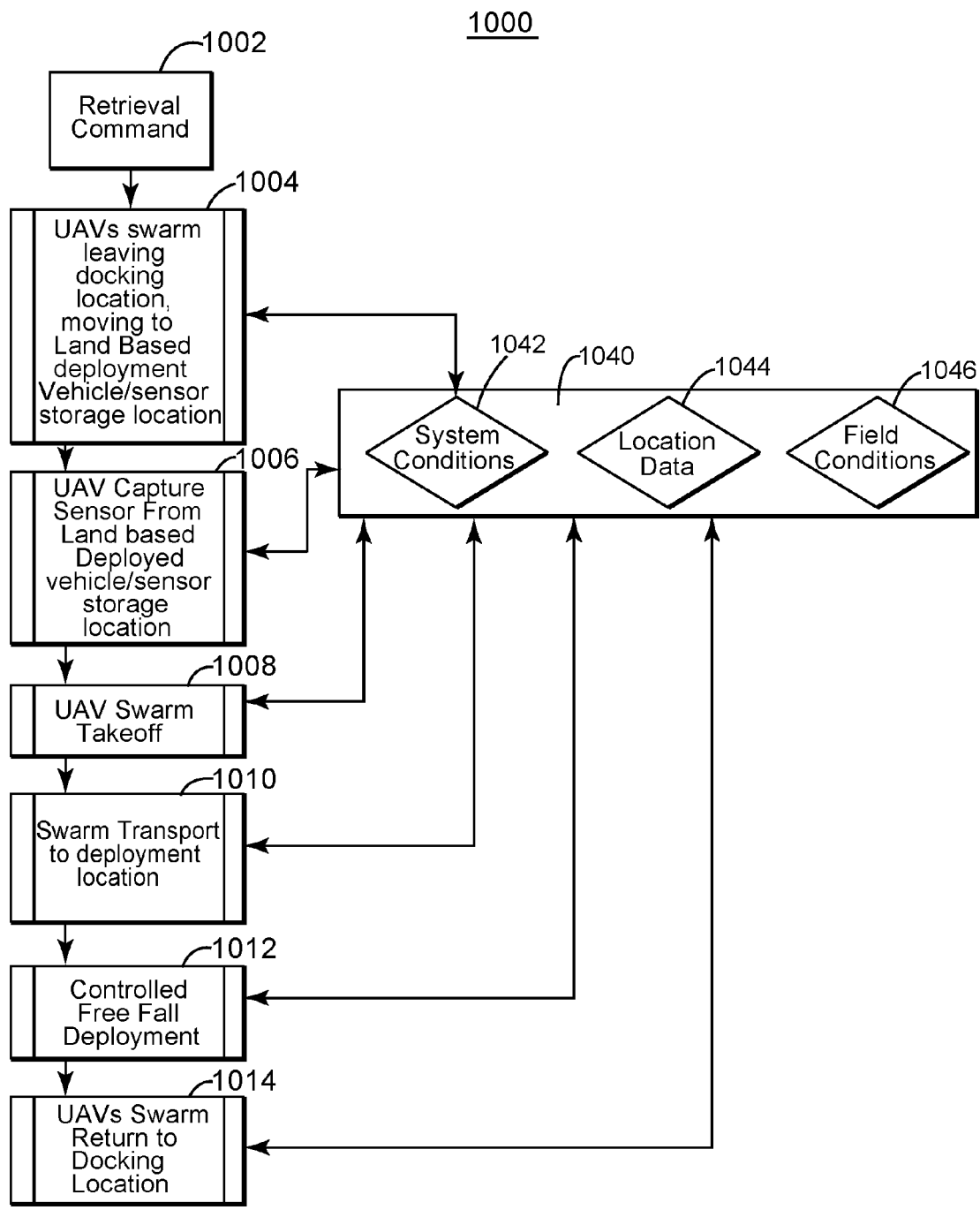
FIGS. 10 and 11 illustrate a process of deploying plural sensor devices with a swarm of AVs.

An automated deployment and retrieval system of the sensor devices using AV and controlled free-fall is now discussed with regard to FIG. 10. This method may use one or more AVs. For a more efficient system, a swarm of AVs is used. The AVs may be unmanned. To facilitate deployment and retrieval, the exterior shape of the sensor device's housing may have a tubular form. Each AV may be equipped with a system that facilitates the capture of the sensor, e.g., a radar system or echo location device or similar device.

The method now discussed takes into account required deployment locations, system conditions, and weather and/or field conditions. This is achieved either with a preset control system or with embedded systems. Both systems may be configured with learning algorithms to learn on the field and adjust the planned course according to the evolution of field conditions and system conditions of each AV in the swarm (e.g., battery charge, malfunction, etc.). Some of the considerations taken into account by such a system are the prioritization/optimization of the deployment location, drop location based on weather condition for more accurate deployed sensor position accuracy (release point determination), etc.

According to this embodiment, the system iteratively and possibly, continuously, uses available data (system, location and field conditions) for each stage of the process (although in some cases, some steps could use a preset data set for the three conditions). The sensor devices could be stored at a field storage location or on a vehicle on field, and the AVs could be located on field on a vehicle or at a docking station, where they could be recharged, data could be retrieved or uploaded and any maintenance could be performed.

Figure 11:
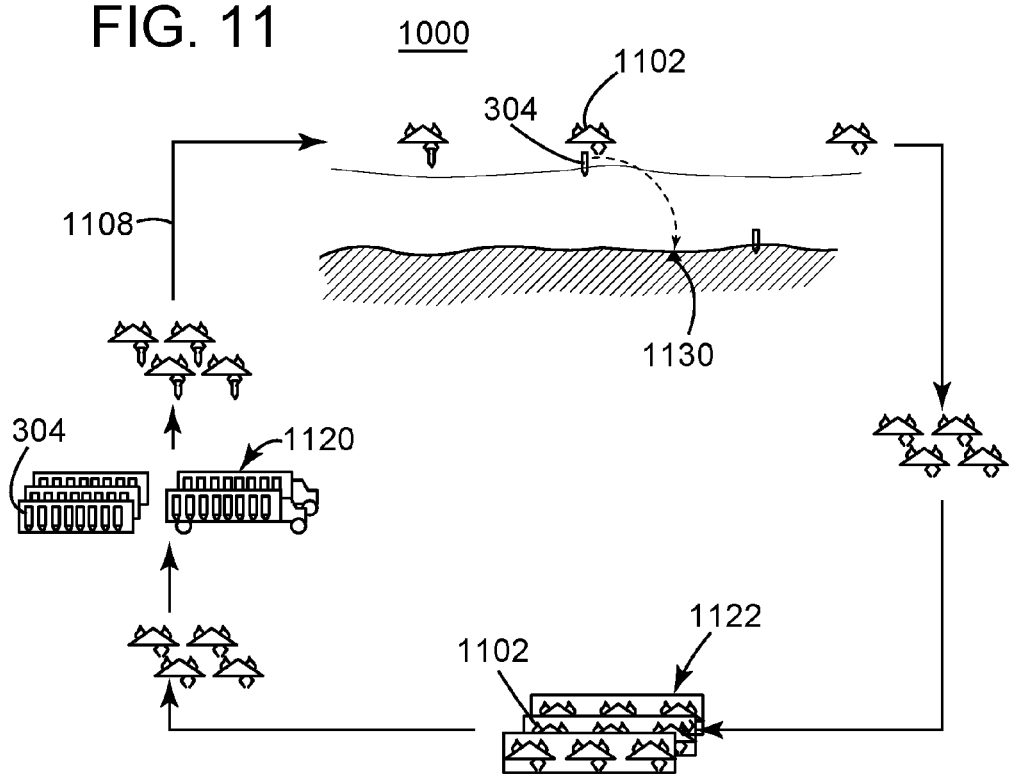

More specifically, as illustrated in FIG. 10, a seismic survey system 1000 receives in step 1002 an instruction, from a controller to be discussed later, to deploy the sensor devices 304. FIG. 11 shows the system 1000 having the sensor devices 304 located in the field, at a given location 1120 and the AVs 1102 located at another location 1122. As noted above, these two locations may be mobile (i.e., located on trucks) or stationary (base stations). Further, these two locations may provide support functions, as data transfer, battery charging, and other maintenance functions. The two locations may be distributed at many different positions across the survey field for improved efficiency.

In step 1004, the AV swarm leaves its location 1122 and moves to the sensor devices' location 1120 for collecting corresponding sensor devices. Both the AVs and the sensor devices communicate with a system condition module 1042, which is part of a coordination system 1040. System condition module 1042 may include a transceiver for communicating with the AVs and the sensor devices, a processor for processing the acquired data and a memory for storing this data. The data exchanged with the AVs and sensor devices may include, for example, a battery status of each device, an overall status of each device, an availability condition of each device, and/or an identification number of each device. Coordination system 1040 may also include a location data module 1044 and a field conditions module 1046. Location data module 1044 may store location information associated with each of the AVs and/or sensor devices. The location information may be transmitted by each device to the module. Each device may have its own GPS for determining the location information. In another embodiment, the coordination system 1040 may include a GPS and radar system for determining the position of each sensor device and AV. The field conditions module 1046 may store information related to wind, temperature, humidity, etc. of an area associated with each seismic survey. This information may be obtained from a dedicated weather service, or it can be measured on the field, or both.

In step 1006, each AV loads one or more corresponding sensor devices 304 at their location 1120. Information related to this step is exchanged with the coordination system 1040. Then, in step 1008, the swarm of AVs takes off, as also illustrated in FIG. 11, and transports the sensor devices 304 to their deployment location in step 1010. In step 1012, the AV 1102 releases a corresponding sensor device 304 to a desired target location 1130. In step 1014, after the AV has released all its sensor devices (if more than one is transported), the AV returns to its docking station at location 1122. Note that FIG. 10 indicates that each step 1004-1014 may exchange information with coordination system 1040, for updating the location data module 1044 and system condition module 1042 with information about the AVs and sensor devices.

Figure 13:
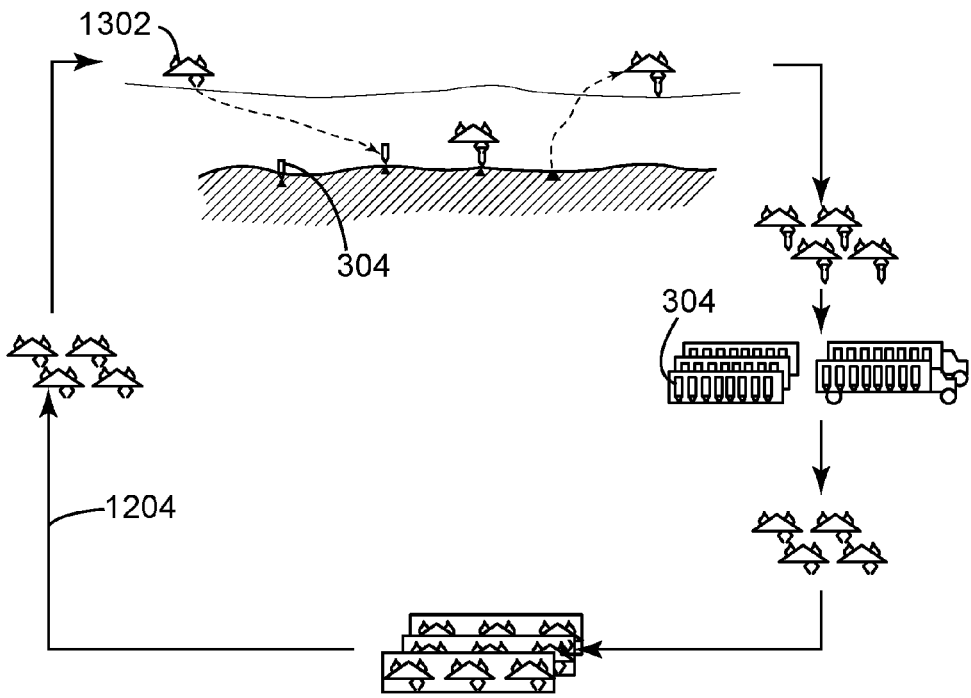
FIGS. 12 and 13 illustrate a process of retrieving plural sensor devices with a swarm of AVs.
Figure 12:
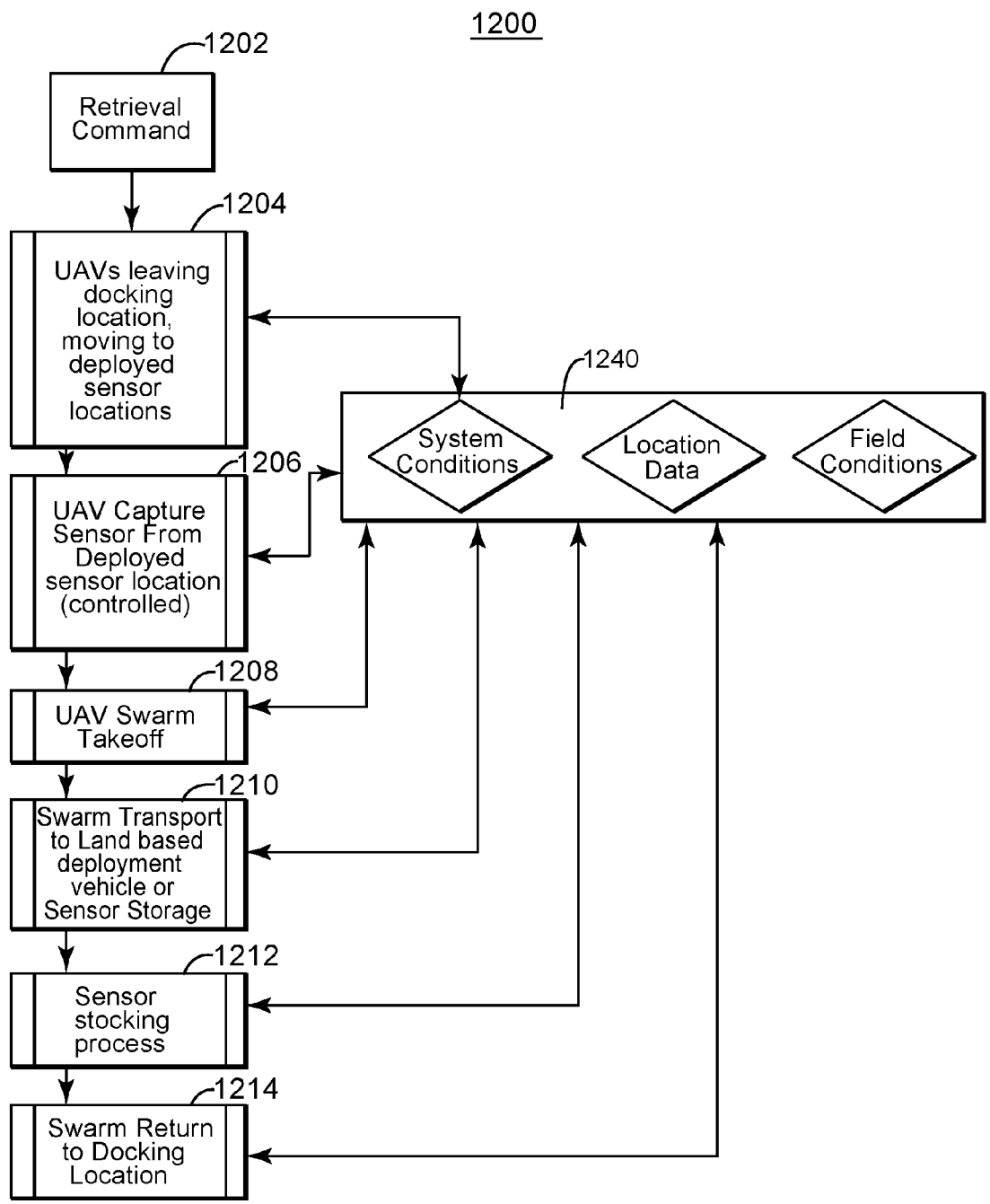
Figure 14:
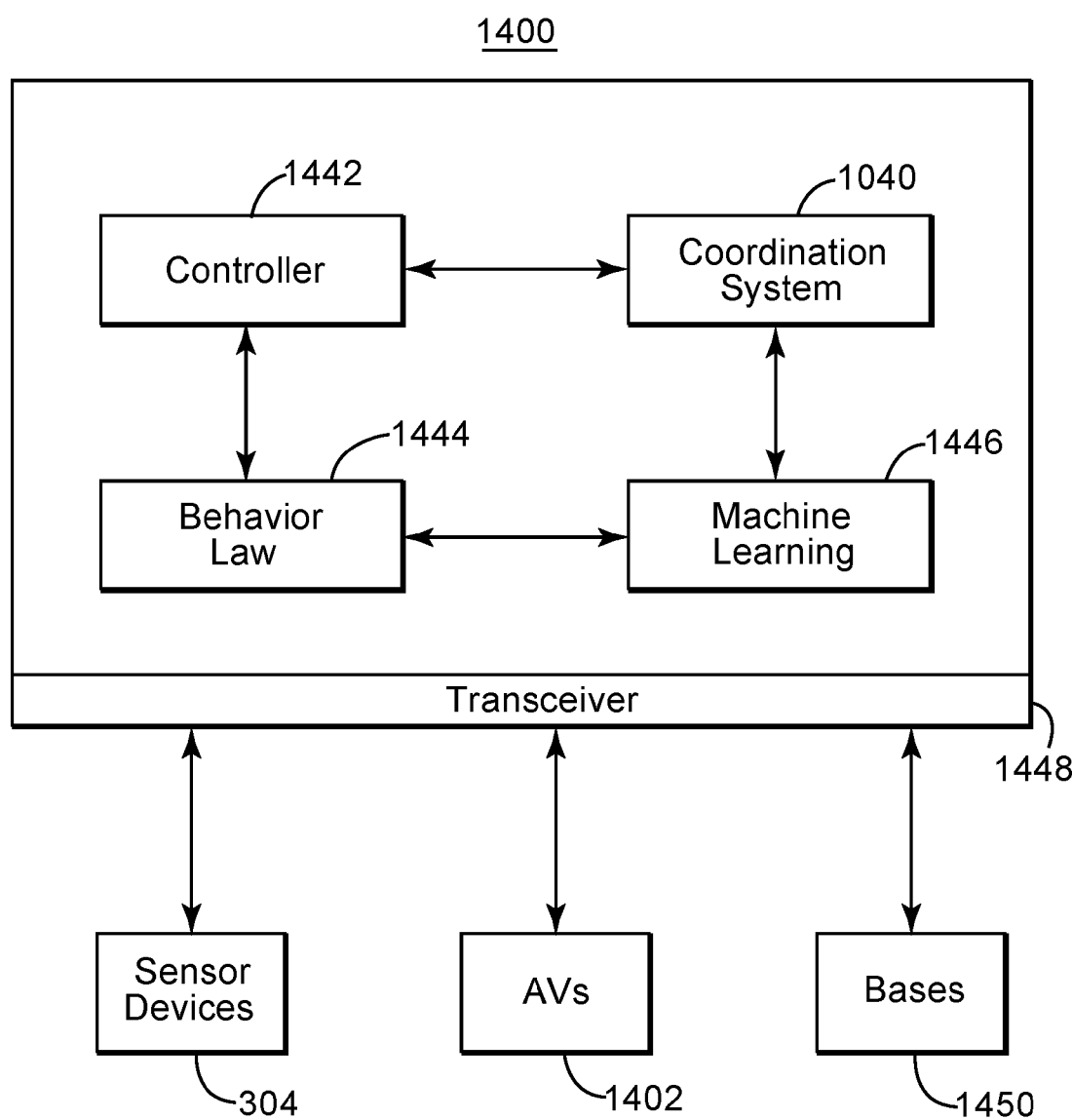
FIG. 14 illustrates a deployment/retrieval system.

FIGS. 12 and 13 illustrate the process of retrieving the sensor devices after the seismic data has been collected. The process starts with step 1202 in which the controller issues a retrieval command. In step 1204, the AVs leave the docking station and move toward the deployed sensor devices 304. In step 1206, an AV 1302 captures the top section of a corresponding sensor device 304 and removes it from the corresponding bottom section. In one embodiment, if the sensor device is made of a single section, the AV removes the entire sensor device. In step 1208 the swarm of AV takes off with their sensor devices and in step 1210 the AVs bring the sensor devices to their bases (e.g., sensor device storage facility, land based mobile facility, etc.). In step 1212, the bases may transfer the data from the sensor devices and recharge their batteries. In step 1214, the swarm returns to their own docking station for maintenance and/or refueling and/or other support functions. Similar to the embodiment illustrated in FIG. 10, the coordination system may communicate at each step with the sensor devices and/or AVs.

In another embodiment to be discussed next, the seismic system 1000 can be further improved to learn from past activities, i.e., to have a machine learning capability. The machine learning capability may be housed in a corresponding processor/controller as now discussed.

As discussed above, for high density acquisition, it is necessary to deploy and retrieve a very high number of sensor devices on field. This process is traditionally handled by a large group of personnel on field, either by hand or using heavy or portable specialized machinery. This is a time consuming process which could also have problems with inaccurate sensor placement during deployment, damage to sensors during deployment, human risks, etc.

A novel deployment/retrieval system 1400 includes a controller 1442 that coordinates the various modules now discussed. System 1400 also includes the coordination system 1040, previously discussed. System 1400 may also include a behavior law module 1444 and a machine learning engine 1446. These two last modules are discussed later. The novel system 1400 may interact with sensor devices 304, AVs 1402 and one or more of sensor device's and/or AV's bases 1450. A transceiver 1448 may be present in system 1400 for ensuring the communication with the sensor devices, AVs and their bases.

The new deployment/retrieval system 1400 allows the free-fall deployment of the sensor devices from the AV with in flight motion, based on the environment, AV motion and the surface topography. Real-time free fall behavior laws are calculated in module 1444 based on the data from coordination system 1040, which includes environment parameters (wind, temperatures, fleet level, etc.), AV fleet motion parameters (distance between AV, speed, etc.) and terrain knowledge (type of soil, etc.)

The system enables the sensor device's activation next to or prior to the drop, for a prolonged field battery life. Real-time AV fleet control and decisions are made due to the real-time computation of the fleet behavior laws. Each fleet behavior law module 1444 includes a combination of individual AV's behavior laws.

System 1400 enable the seismic system to self-choose, in real-time, the best AV(s) to drop sensor devices at specific position(s). The machine learning module 1446 enables a self-learning capability, including the usage of machine learning/neural network technologies to optimize future operations (speed, efficiency, behavior laws optimization, etc.). Future operations could be at other fields or other patches of same deployment field/area. Self-learning capabilities also include the capturing of the surface terrain information.

The capturing of the terrain information may be performed by the sensor device when impacting with the surface and during the survey. The data is transmitted, in real-time to the other actors of the operation (fleets, AVs and remote and/or in-field control center) by a communication network (e.g., transceiver 1448), which is part of deployment/retrieval system 1400. Due to the self-learning loop and additional terrain knowledge, fleet and AVs optimize the necessary thrusting and required vertical energy to ensure the sensor device's coupling or retrieval. Fleet knowledge is shared with the other fleets and/or individual AV during the overall operation.

Figure 15:
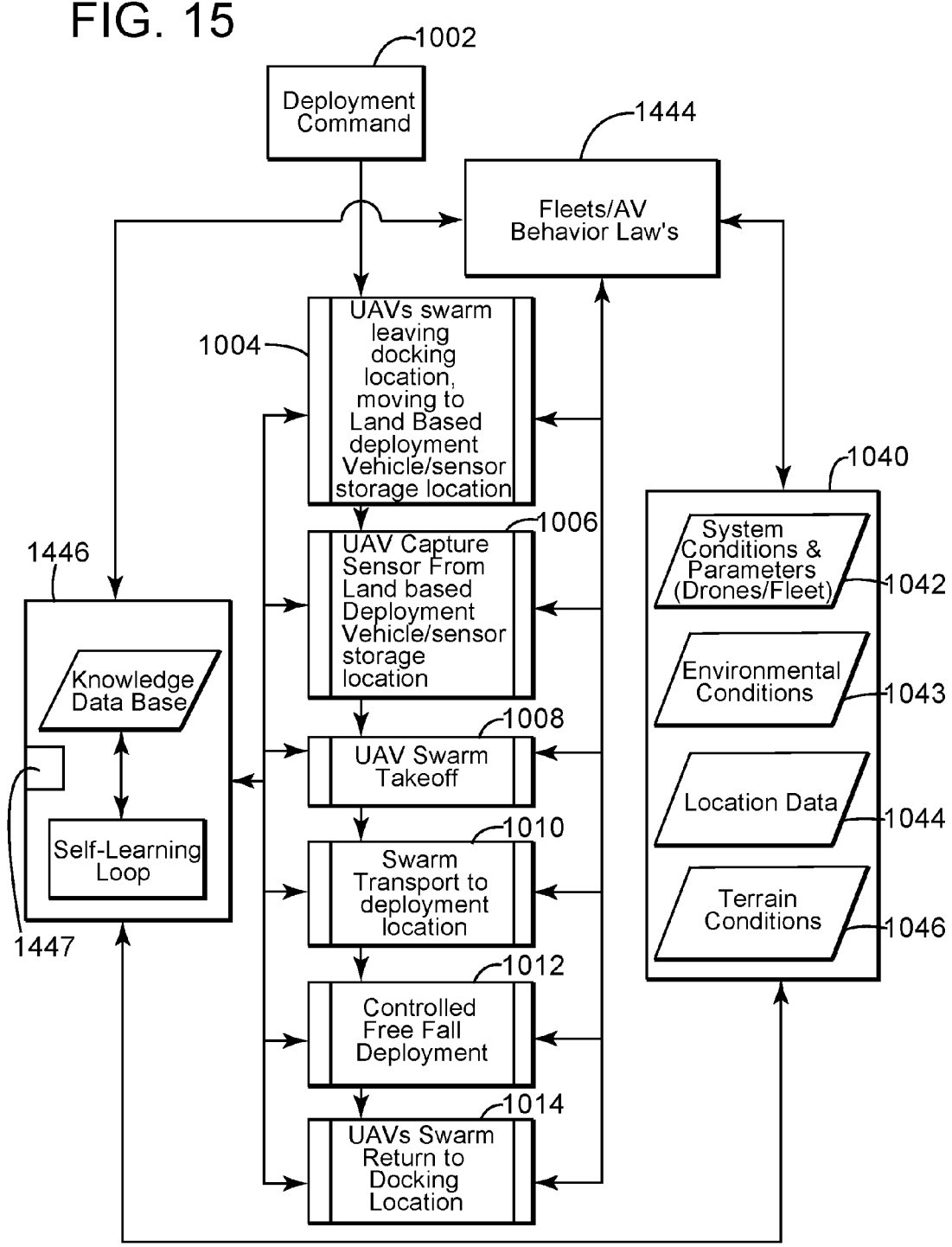
FIG. 15 illustrates a process of deploying sensor devices by a system with machine learning capability.
Figure 16:
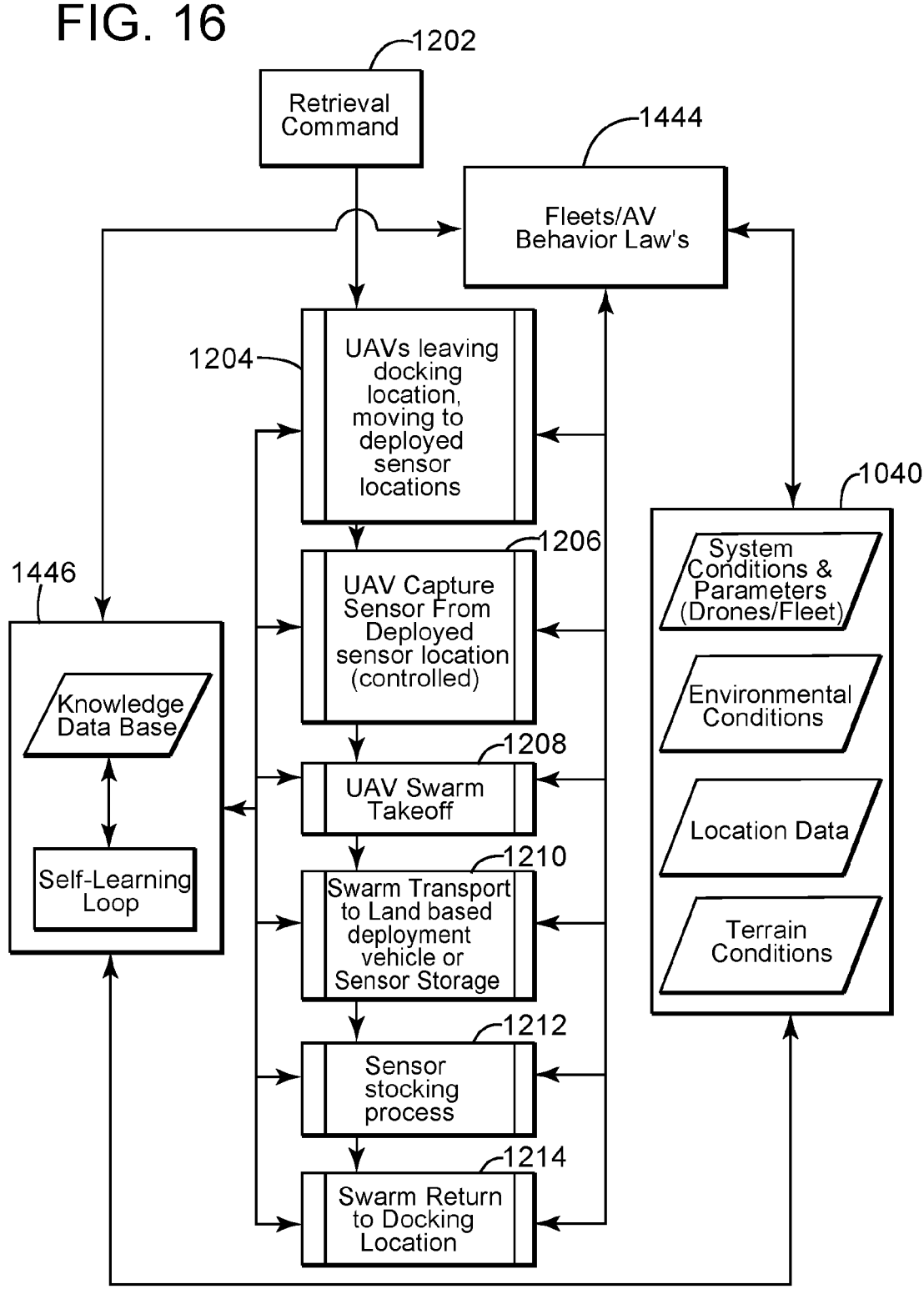
FIG. 16 illustrates a process of retrieving sensor devices by a system with machine learning capability.

One of the possible workflows for deployment and retrieval is illustrated in FIGS. 15 and 16. Note that FIGS. 15 and 16 include the steps of FIGS. 10 and 12, respectively. In addition, the behavior law module 1444, learning module 1446 and coordination module 1040 are shown interacting with these steps. The system would iteratively and possibly continuously use available data from coordination module 1040 for each stage of the process (although in some cases, some steps could use a preset data set for the external conditions). Note that coordination module 1040 has a new module 1043 that is related to the environmental conditions (e.g., wind speed at the attitude at which the AVs are flying).

One or more advantages associated with such embodiments is the quick and accurate deployment and retrieval of the sensor devices, safer operations on field, better handling of sensor devices (less chance of damage), intelligent self-learning decision making capability, and intelligent fleets management capability.

An improvement model module 1447 (shown in FIG. 15 as being located in the learning module 1446) may be configured, in software, to include the following features: (a) dynamic population of a database system which includes all types of data (system parameters, environmental conditions, location data, terrain conditions, required operation plans, etc.), (b) update of the self-learning/machine and learning/automated improvement system/model, (c) update and improvement of behavior laws module taking into account features (a) and (b); (d) update and improvement of AV choice (best AV to perform specific drop/mission, etc.) taking into account features (a) and (b).

Regarding the AV selection, this feature enables the choice of the best available AV to perform dropping and/or quality control (QC) at terrain positions $T_1$ to $T_n$. This could be defined by the following vector function:

$$\begin{bmatrix} AV_1 \\ \vdots \\ AV_n \end{bmatrix} = F_{DC}(T, SP, IM, FL, EC, TC)$$

where $F_{DC}$=AV Choice Function
$AV_i$=AV number i;
T=Time;
SP=System Parameters at time T;
IM=Improvement Model;
FL=Fleet Location at time T;
EC=Environmental Condition at time T; and
TC=Terrain Conditions at time T.

Focusing on one AV, the sensor device's drop will be piloted via the behavior law module, which includes logic defined as follows. The concept of controlled free-fall noted above with respect to the descent of each sensor device, describes the successive positions (X, Y, Z) of the sensor device while moving to reach the terrain target, after being launched from the AV launch system. The controlled free-fall path may be defined, in one embodiment, by a continuous "behavior law" set of rules, which predicts the position of the sensor device at time T, by taking in account data from to environmental conditions module 1043, improvement model module 1447 (which may be located in the machine learning module 1446), system parameters module 1042, location data module 1044 and terrain conditions module 1046. Thus, the positions Px, Py and Pz of a given sensor device may be written as:

$$\begin{bmatrix} P_X \\ P_Y \\ P_Z \end{bmatrix}_T = F_C(T, SP, IM, FL, EC, TC)$$

where
$F_c$=Behavior Law Function;
T=Time;
SP=System Parameters at time T
IM=Improvement Model;
FL=AV Fleet Location at time T;
EC=Environmental Condition at time T; and
TC=Terrain Conditions at time T.

This function $F_c$ is the basis of the compartment laws module. The behavior laws will vary based on each update from the Improvement Model and AV choice steps.

The system parameters managed by the system parameters module 1042 are measured and communicated to other sensor devices and/or AVs not only during pre-deployment diagnosis, for example, at docking station or on field location, but also post deployment by various communication means (e.g., transceivers). The exchanged data may include data from the AV and/or AV fleet or from other sensor devices.

The system parameters may include, but are not limited to, battery level, type of AV, fleet configuration, AV configuration inside fleet, etc.

The environmental conditions are measured and communicated among the AVs and sensor devices. These conditions may include local condition monitoring systems (such as wind speed monitors, temperature monitors, particulate matter sensors, etc.), which provides base for knowledge data base (DB) and is updated as required on field. It is also possible to have AV based local measurement for similar parameters, which would be communicated and added to the DB for updates.

The location data is relevant to both the absolute and relative position of the AVs and/or sensor devices. The absolute position of each AV member of the fleet may be obtained by various positioning methods (e.g., GPS, Inertial measurement, etc.). The relative and absolute position measurements are communicated to a knowledge DB for routine updates of the laws. Location data is utilized for four primary functions: (1) fleet position/shape, (2) AV location, (3) AV relative location within the fleet; and (4) required deployment location.

The terrain condition data from the terrain conditions module 1046 may include pre-known conditions from GIS data, live measured parameters on field by various means, live measured parameters by AVs during deployment/coupling QC process (done by the sensor device when impacting with the surface and during the survey). The data may be transmitted in real time to the other actors of the operation (fleets, AV and remote and/or in-field control center) through a communication network, which is part of a control and command system.

Figure 17:
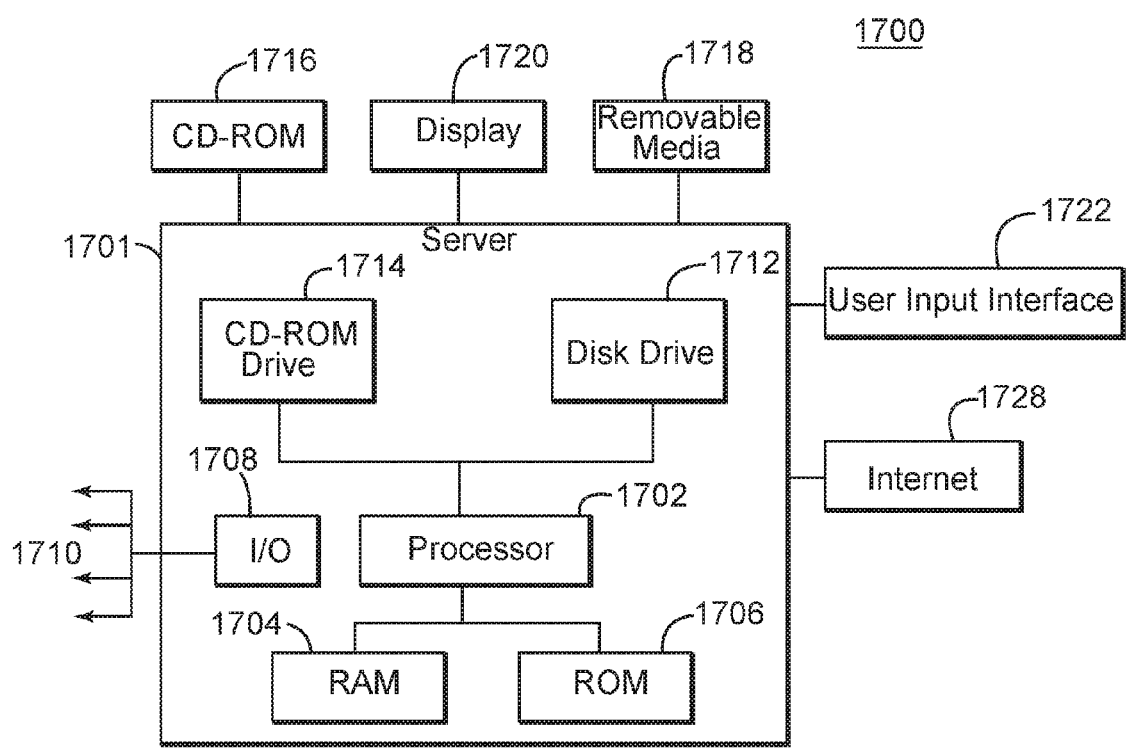
FIG. 17 is a schematic block diagram of a controller.

The above-discussed procedures and methods may be implemented in a computing device as illustrated in FIG. 17. Hardware, firmware, software or a combination thereof may be used to perform the various steps and operations described herein. Computing device 1700 of FIG. 17 is an exemplary computing structure that may be used in connection with such a system.

Exemplary computing device 1700 suitable for performing the activities described in the exemplary embodiments may include a server 1701. Such a server 1701 may include a central processor (CPU) 1702 coupled to a random access memory (RAM) 1704 and to a read-only memory (ROM) 1706. ROM 1706 may also be other types of storage media to store programs, such as programmable ROM (PROM), erasable PROM (EPROM), etc. Processor 1702 may communicate with other internal and external components through input/output (I/O) circuitry 1708 and bussing 1710 to provide control signals and the like. Processor 1702 carries out a variety of functions as are known in the art, as dictated by software and/or firmware instructions.

Server 1701 may also include one or more data storage devices, including hard drives 1712, CD-ROM drives 1714 and other hardware capable of reading and/or storing information, such as DVD, etc. In one embodiment, software for carrying out the above-discussed steps may be stored and distributed on a CD-ROM or DVD 1716, a USB storage device 1718 or other form of media capable of portably storing information. These storage media may be inserted into, and read by, devices such as CD-ROM drive 1714, disk drive 1712, etc. Server 1701 may be coupled to a display 1720, which may be any type of known display or presentation screen, such as LCD, plasma display, cathode ray tube (CRT), etc. A user input interface 1722 is provided, including one or more user interface mechanisms such as a mouse, keyboard, microphone, touchpad, touch screen, voice-recognition system, etc.

Server 1701 may be coupled to other devices, such as sources, detectors, etc. The server may be part of a larger network configuration as in a global area network (GAN) such as the Internet 1728, which allows ultimate connection to various landline and/or mobile computing devices.

The embodiments disclosed herein provide a sensor device and method for collecting seismic data with improved coupling between the seismic sensor and ground. As noted above, the ground can be above or below water. In other words, the embodiments discussed above may be implemented in a marine embodiment, where the aircraft is a vessel or submarine or autonomous underwater vehicle, the sensor device floats toward the ocean bottom in controlled way, its bottom section enters the ocean bottom and releases the coupling material into the ocean bottom for a better coupling. Sensor devices that are used on the ocean bottom are known in the art as ocean bottom stations. It should be understood that this description is not intended to limit the invention. On the contrary, the described embodiments are intended to cover alternatives, modifications and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the disclosed embodiments are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A sensor device for recording seismic data, the sensor device comprising:
a top section;
a bottom section removably attached to the top section through a connecting plug; and
a seismic sensor,
wherein the bottom section holds inside a chamber (1) the seismic sensor and (2) a coupling material that surrounds the seismic sensor, the coupling material being released into ground upon the bottom section impacting the ground so that the coupling material forms an interface between the seismic sensor and the ground.

2. The sensor device of claim 1, further comprising:
a fly control mechanism attached to the top section for controlling a free fall toward the ground.

3. The sensor device of claim 1, wherein the bottom section comprises:
a housing;
a piston that separates the housing into first and second chambers and is free to move inside the housing;
the seismic sensor located in the second chamber; and
the coupling material is located in the second chamber.

4. The sensor device of claim 3, wherein the housing has pathways in side walls through which the coupling material is released outside the housing.

5. The sensor device of claim 4, further comprising:
caps for plugging the pathways and for keeping the coupling material within the second chamber before landing on the ground.

6. The sensor device of claim 3, wherein the housing has a tip section having a pointed shape for penetrating the ground.

7. The sensor device of claim 4, wherein pathways closer to the top section have a different diameter than pathways further from the top section.

8. The sensor device of claim 1, wherein the coupling material is a gel.

9. The sensor device of claim 1, wherein the coupling material is in a first state while inside the bottom section and is in a second state, different from the first state, while outside the bottom section.

10. The sensor device of claim 1, wherein the top section comprises:
a positioning system that measures a position of the sensor device;
a communication system that communicates with a support vehicle;
a fly control mechanism that controls a free fall of the sensor device;
a power system that supplies electrical power; and
a processing system that communicates with a seismic sensor located in the bottom section and stores recorded seismic data.

11. The sensor device of claim 1, wherein the bottom section is made of a biodegradable material.

12. A seismic system for recording seismic data, the seismic system comprising:
a sensor device that measures seismic data; and
an aerial vehicle configured to release the sensor device from a certain height above a target position,
wherein the sensor device includes,
a top section,
a bottom section removably attached to the top section through a connecting plug, and
a seismic sensor,
wherein the bottom section holds inside a chamber (1) the seismic sensor and (2) a coupling material that surrounds the seismic sensor, the coupling material being released into ground upon the bottom section impacting the ground so that the coupling material forms an interface between the seismic sensor and the ground.

13. The seismic system of claim 12, wherein the bottom section comprises:
a housing;
a piston that separates the housing into first and second chambers and is free to move inside the housing;
the seismic sensor located in the second chamber; and
the coupling material is located in the second chamber.

14. The seismic system of claim 13, wherein the housing has pathways in side walls through which the coupling material is released outside the housing.

15. The seismic system of claim 14, further comprising:
caps for plugging the pathways and for keeping the coupling material within the second chamber before landing on the ground.

16. The seismic system of claim 12, wherein the top section comprises:
a positioning system that measures a position of the sensor device;
a communication system that communicates with a support vehicle;
a fly control mechanism that controls a free fall of the sensor device;
a power system that supplies electrical power; and
a processing system that communicates with a seismic sensor located in the bottom section and stores recorded seismic data.

17. A method for collecting seismic data, the method comprising:
deploying an aerial vehicle, which carries a sensor device, above a target position on the ground;
releasing the sensor device from a certain height above the ground; and
releasing a coupling material from inside a chamber of the sensor device when hitting the ground,
wherein the chamber of the sensor device holds (1) a seismic sensor and (2) the coupling material, the coupling material surrounding the seismic sensor, and
wherein the coupling material forms an interface between the seismic sensor and the ground and provides a better coupling of the seismic sensor inside the sensor device with the ground.

18. The method of claim 17, further comprising:
controlling a free-fall descent of the sensor device to the target position.

19. The method of claim 17, further comprising:
recording seismic data with the sensor device; and
recovering a top section of the sensor device with the aerial vehicle while a bottom portion remains in the ground.

20. The method of claim 17, further comprising:
exchanging commands in a wireless manner between the aerial vehicle and the sensor device.

21. A sensor device for recording seismic data, the sensor device comprising:

a top section;
a seismic sensor; and
a bottom section removably attached to the top section through a connecting plug, the connecting plug electrically connecting the two sections to each other,
wherein the bottom section holds inside a chamber a coupling material that is released into ground upon the bottom section impacting the ground so that the coupling material forms an interface between the seismic sensor and the ground.

* * * * *